Oct. 19, 1971 S. RAND 3,613,468
CONTINUOUSLY VARIABLE TRANSMISSION SYSTEM
EMPLOYING SEGMENTED PULLEYS
Filed July 22, 1970 2 Sheets-Sheet 1
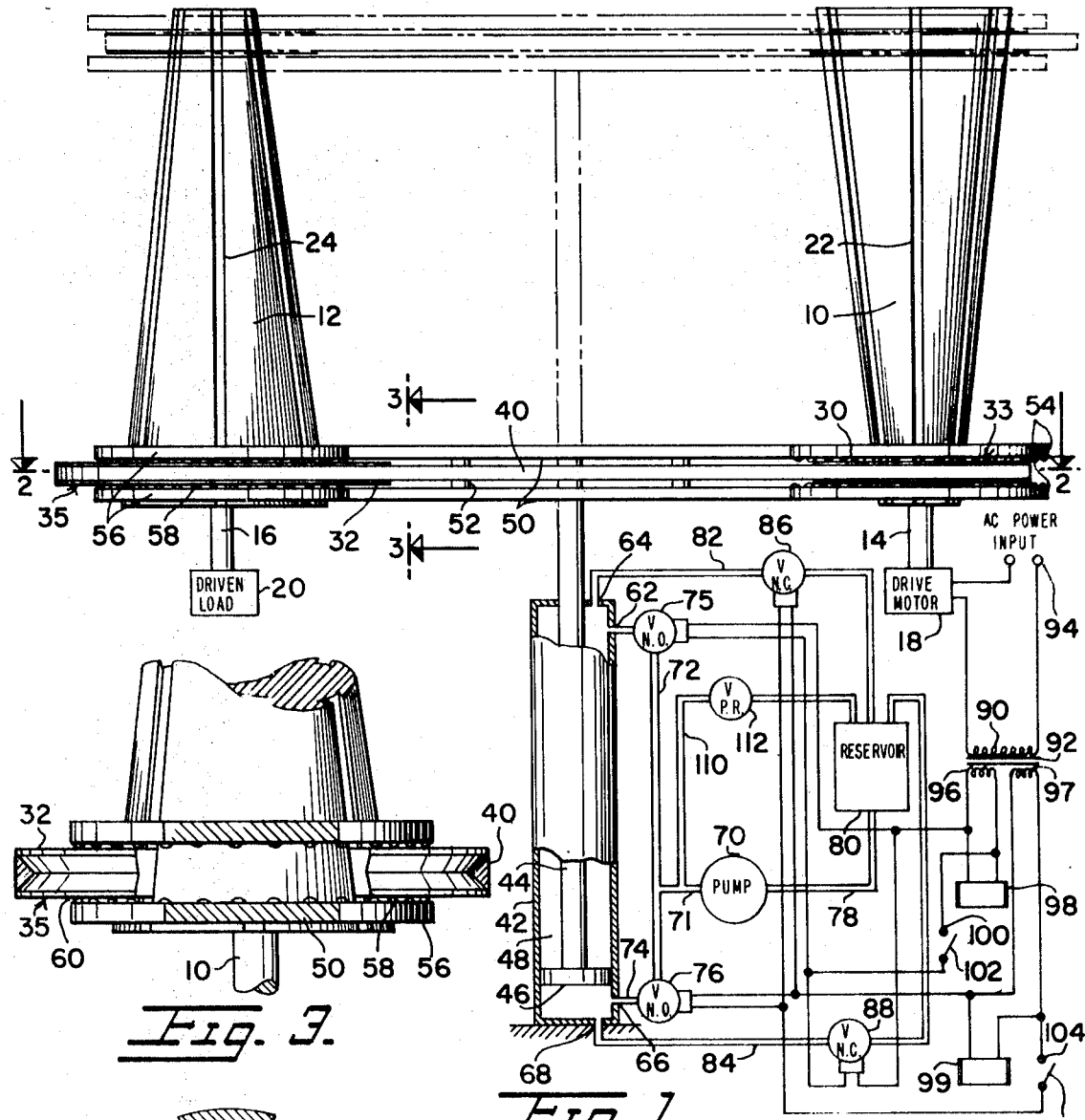
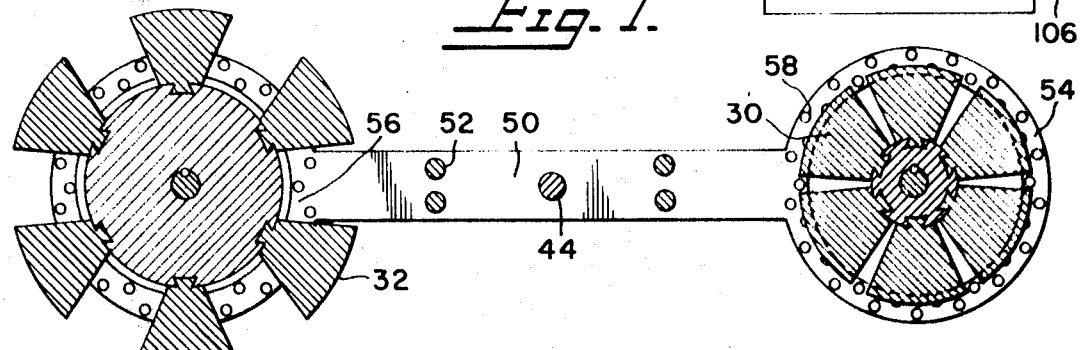
INVENTOR.
SYDNEY RAND
BY Polachek & Saulsbury
ATTORNEYS

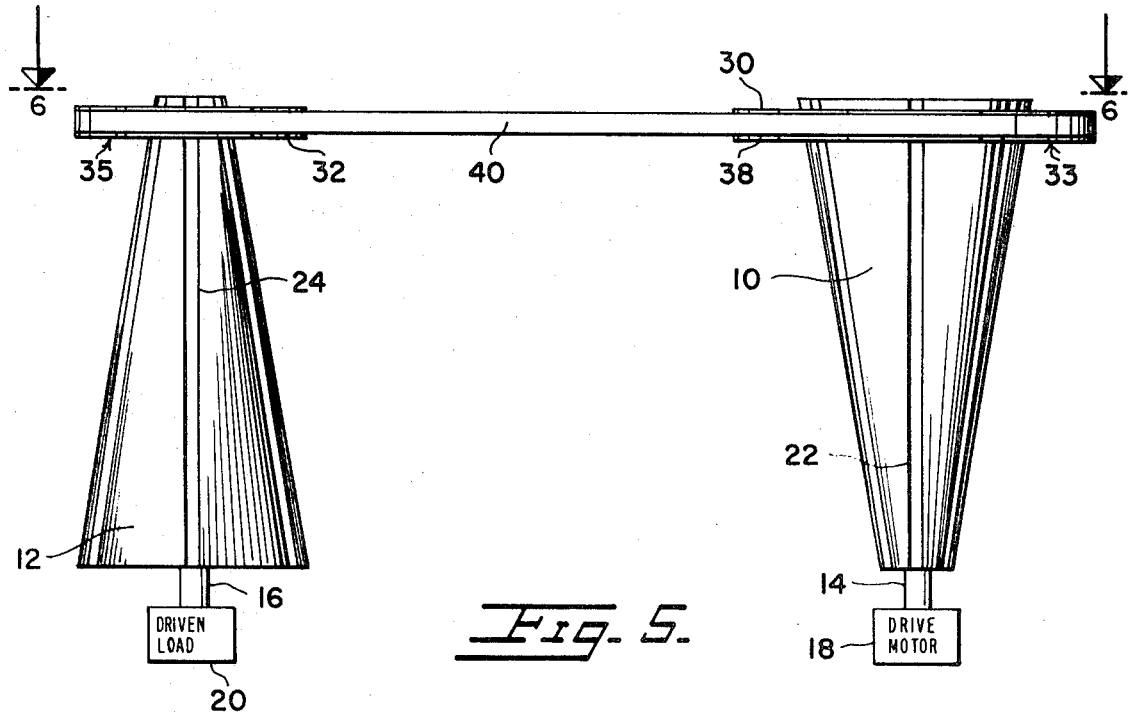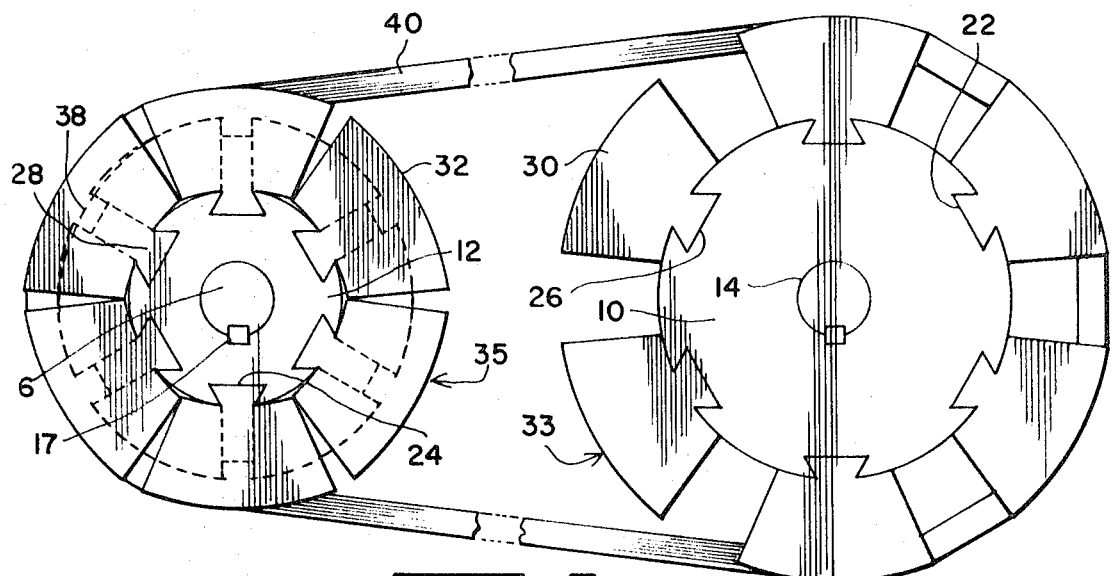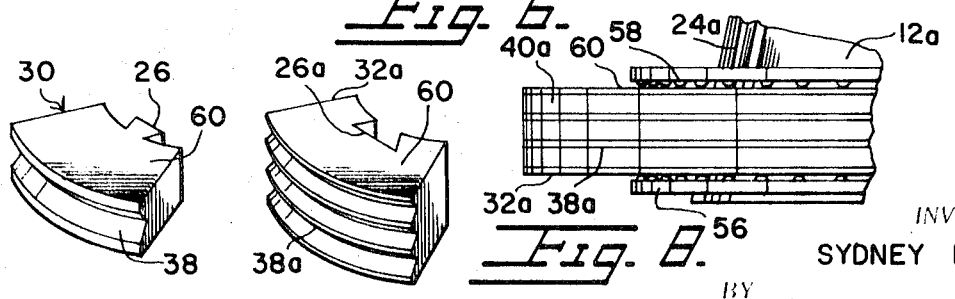

United States Patent Office 3,613,468
Patented Oct. 19, 1971

3,613,468
CONTINUOUSLY VARIABLE TRANSMISSION SYSTEM EMPLOYING SEGMENTED PULLEYS
Sydney Rand, G.P.O. 2034, San Juan, Puerto Rico 00936
Filed July 22, 1970, Ser. No. 57,173
Int. Cl. F16h 9/16
U.S. Cl. 74—217 CV
10 Claims

ABSTRACT OF THE DISCLOSURE

A mechanical transmission system includes axially parallel conical members on which are longitudinally slidable pulley segments constituting composite pulleys drivingly engaged by one or more drive belts. Simultaneous movement of the pulley segments and belt changes the ratio of pulley diameters as the pulley segments move longitudinally and radially of the conical members. Means for shifting the pulley segments and belt simultaneously is provided. A drive motor and driven load can be coupled to the conical members. Control means responsive to the magnitude of power drawn by the drive motor in response to change in the load automatically actuates the shifting means to position the pulley segments for setting an optimum ratio of pulley diameters.

---

This invention relates to variable mechanical transmission systems wherein power is transmitted from a drive shaft to a driven shaft by means of a continuous belt entrained on pulleys carried by the shafts, and more particularly the invention concerns a continuously variable mechanical transmission system in which composite pulleys are segmented in form and are slidably carried by hubs on the shafts.

Heretofore it has been found difficult or impossible to provide a continuously variable mechanical transmission system by means of conventional V-belts and multiple sheaves, without excessive friction losses and instability of drive ratios. Where continuously variable drive is necessary, recourse has been had to torque converters and other hydraulic or fluid transmission systems which are very complicated and costly.

The present invention is directed at a relatively simple and inexpensive mechanical transmission system employing a continuous belt drive wherein speed of the driven shaft and torque applied thereto may be varied without any interruption in transmission of power from a drive shaft to a driven shaft, and without any variation in the belt drive.

According to the invention, the drive and driven shafts carry axially parallel reversely disposed conical hubs with longitudinally dovetailed grooves therein. Pulley segments are slidably carried by the hubs. These segments have dovetail keys engaged in the grooves. One or more V-belts are entrained on the pulley segments. When the pulley segments and belt or belts are shifted simultaneously axially of the hubs, the drive ratio and torque vary continuously. An infinite number of drive ratios can thus be attained between upper and lower limits. An optimum ratio can be achieved automatically by means of an associated control means for the belt and segment shifting means.

It is therefore one object of the invention to provide a mechanical transmission assembly in which a drive pulley comprises a plurality of segments movably disposed in a circumferential array on a support.

Another object is to provide a mechanical transmission assembly including a conical hub with a composite pulley formed by a plurality of pulley segments sidably movable along the hub and arranged to engage one or more endless drive belts, so that the diameter of the pulley is variable by shifting the pulley segments and drive belt axially of the hub.

A further object is to provide a mechanical transmission system employing an endless belt driving segmented pulleys, the drive belt and segmented pulleys being axially shiftable with respect to drive and driven shafts on supports carried by the shafts to effect continuous variation in torque and drive ratio.

A further object is to provide a mechanical transmission system as described with means for shifting the drive belt and segmented pulleys axially of the shafts.

A further object is to provide a mechanical transmission system as last described, further comprising means responsive to the load on the driven shaft for automatically shifting the drive belt and segmented pulleys to change drive ratio automatically and continuously within prescribed limits.

A further object is to provide a mechanical transmission system as last described, further comprising means for automatically setting the drive ratio at optimum value for a given load.

Another object is to provide a mechanical transmission system as described in which transmission of power from one shaft to another remains uninterrupted while drive speed and drive ratios are continuously changed.

Another object is to provide mechanical transmission assemblies and systems as described employing endless V-belt drives.

Other and further objects, advantages and features of the invention will become apparent from the following detailed description taken together with the drawings, wherein:

FIG. 1 is a side view partially diagrammatic in form of a mechanical transmission system embodying the invention.

FIG. 2 is a cross sectional view taken on line 2—2 of FIG. 1.

FIG. 3 is a fragmentary enlarged vertical sectional view taken on line 3—3 of FIG. 1.

FIG. 4 is a perspective view of a pulley segment.

FIG. 5 is a side view partially diagrammatic in form of a transmission assembly used explaining the invention.

FIG. 6 is an enlarged plan view with parts omitted taken on line 6—6 of FIG. 5.

FIG. 7 is an enlarged fragmentary side view similar to a part of FIG. 1, showing a portion of a transmission system employing a multiple V-belt drive.

FIG. 8 is a perspective view of a pulley segment employed in the system of FIG. 7.

Referring first to FIGS. 5 and 6, there is shown a transmission assembly including a pair of conical hubs 10 and 12 carried by axial shafts 14 and 16 and secured by keys 17. Drive shaft 14 is coupled to a drive motor 18 and driven shaft 16 is coupled to a driven load 20. The hubs are axially parallel to each other and reversed in position so that the wider end of one hub is coplanar with the narrow end of the other hub and vice versa. The hubs have longitudinally extending circumferentially spaced dovetailed grooves 22, 24 in which are engaged keys 26, 28 of pulley segments 30, 32. The array of pulley segments 30 define one composite pulley 33, and pulley segments 32 constitute another composite pulley 35. The pulley segments have V-grooves 38 formed in outer sides thereof; see FIG. 4. An endless belt 40 which is V-shaped in cross section is entrained on the pulley segments.

It will be apparent that the rotational speed of driven shaft 16 and the torque applied thereto will change depending on the ratio of the effective diameters of composite pulleys 33, 35 as the pulleys and belt are moved laterally axially of shafts 14, 16. The pulley segments on one hub will move radially outward to increase the pulley diameter while the pulley segments on the other hub will move radially inward to decrease the pulley diameter. In the arrangement shown in FIGS. 5, 6 the rotational speed of shaft 16 is greater than that of shaft 14. If the pulleys and drive belt are moved as a unit downward axially of the shafts, the rotational speed of driven shaft 16 will decrease while the applied torque will increase. The apical angles of the conical hubs is assumed to be equal, the hubs are axially parallel and of equal length, and the pulley segments have the same radial dimensions. Thus the total length of the belt drive remains the same as the pulley segments and belt move downward and drive traction and tension in the belt remain constant although the belt actually shifts horizontally to left as it moves downwardly. The belt shifts horizontally a distance substantially equal to the difference in radius between larger and smaller ends of each hub. It will also be apparent that continuous movement of the belt drive and pulley segments from end to end of the hubs effects continuous variation in drive ratio, driven speed and torque. It is not necessary to stop the drive or decouple the shafts to effect speed, torque and drive ratio changes.

FIGS. 5 and 6 show an idealized representation of transmission assembly. In order to shift the pulley segments and belt and to control positions on the hubs, auxiliary actuation and control means must be provided. A mechanical transmission system showing one of a multiplicity of possible ways for moving the belt and pulley assembly automatically in accordance with power requirements of the load and capacity of the drive motor is illustrated in FIGS. 1-3 to which reference is now made.

In the system of FIGS. 1, 2 and 3 parts corresponding to those of FIGS. 5 and 6 are identically numbered. Hubs 10 and 12 are inverted from their positions shown in FIGS. 5 and 6 on shafts 14, 16 to which they are affixed. Belt 40 and segments 30, 32 of composite pulleys 33, 35 are shown at their lowermost position on the hubs.

The belt and pulley segments are shiftable simultaneously as a unit by means of a hydraulic cylinder 42 having an axially vertical piston rod 44. A piston head 46 at the lower end of rod 44 separates hydraulic fluid 48 in the cylinder in compartments above and below the piston head. Secured to the upper end of rod 44 is a pair of vertically spaced horizontal cross bars or plates 50 rigidly joined by vertical bars 52. Ball bearings 58 are set in opposing inner faces of the rings to bear against flat sides 60 of the pulley segments 30, 32 in all positions thereof axially and radially of the hubs and shafts. The inner diameters of the rings are slightly larger than the widest ends of the hubs to permit free axial movement of the rings along the hubs which extend axially through the rings. The radial width of each segment 30 and 32 is slightly larger than the widest radius of each hub so that the ball bearings 58 will contact the sides of the segments in all positions radially of the axis of the hub as clearly shown in FIG. 2.

Cylinder 42 has ports 62, 64 and 66, 68 at opposite ends. A hydraulic pump 70 has an outlet line 71 connected to ports 62, 66 via conduits 72, 74 in which are normally closed electrically operated valves 75, 76. Inlet line 78 is connected from a reservoir 80 to the pump. Ports 64 and 68 are connected via conduits 82, 84 and normally closed electrical valves 86, 88 to reservoir 80. Motor 18 is connected in series with primary winding 90 of transformer 92 and with AC power input terminals 94. The transformer has two secondary windings 96, 97 connected to coils of two relays 98, 99 respectively. Relay 98 has normally open contacts 100, 102. Contact 100 is connected to one end of winding 96. The other end of the winding is connected to one terminal of each valve 86, 88. Contact 102 is connected to the other terminal of each valve 86, 88. Relay 99 has normally open contacts 104, 106. Contact 104 is connected to one end of winding 97. The other end of this winding is connected to one terminal of each valve 74, 75. Contact 106 is connected to the other terminal of each valve 74, 75. Line 71 is connected via conduit 110 and pressure relief valve 112 to reservoir 80.

In operation of the system pump 70 and motor 18 are started simultaneously. Valve 76 which is normally open passes fluid into the bottom of cylinder 42. Valve 75 which is also normally open passes fluid back into the reservoir via conduit 110 and valve 112. The piston 46 and piston rod 44 move up raising cross bars 50 and bearing rings 54, 56. Pulley segments 30 and 32 move upwardly as a unit with belt 40. As the pulley segments move up the diameter of pulley 35 decreases and the diameter of pulley 33 increases. This puts a heavier load on motor 18 and increases the current drawn by the motor. When a predetermined optimum current flows through the transformer winding 90 which is in series with the motor, relay 99 will be actuated to close contacts 104, 106 and thus close valves 75, 76. This will stop axial movement of piston rod 44, rings 54, 56 and pulleys 33, 35. This will fix the ratio of diameters of the composite pulleys at an optimum magnitude. Fluid 48 continues circulation via conduit 110, pressure relief valve 112 and conduit 78 between the pump and reservoir. If the driven load should increase further, beyond the predetermined optimum magnitude, current drawn by the motor will increase further and relay 98 will be actuated to close contacts 100, 102 and operate valves 86, 88 which will open and permit passage of fluid back to the reservoir as the piston rod 44 descends along with the rings 54, 56 and pulleys 33, 35. This will increase the diameter of pulley 35 while the diameter of pulley 33 increases. The speed of driven shaft 20 will decrease lowering the current drawn by the motor until optimum magnitude of drive ratio is reached when relay 98 becomes deactivated and valves 86, 88 close again. Closed valves 75, 76 remain closed since relay 99 remains activated so that the drive ratio of the pulleys becomes fixed at optimum value.

It will be apparent that the system is capable of many variations. The system can be adapted for governing power output or input of internal combustion engines or electric motors. Other control mechanism and circuits can be used. Mechanical changes are also possible. For example, the slots in the hubs can be changed to dovetail ridges and the pulley segments can be changed to dovetail slots to slidably engage the dovetail ridges. Other means can be provided for shifting the pulley segments.

It is also possible to employ multiple drive belts instead of a single drive. Thus as shown in FIGS. 7 and 8, pulley segments 32a have multiple V-grooves 38a in their outer sides. Multiple V-belts 40a are engaged in these grooves. The segments have dovetail grooves 26a at their inner sides which slidably engage on dovetail ridges 24a extending longitudinally of conical hub 12a. Other variations and modifications in the mechanical, electrical and hydraulic parts of the system are possible without departing from the invention as defined in the appended claims.

What is claimed is:

1. Mechanical transmission means, comprising a rotatable support, and a composite pulley having a variable diameter movably mounted on said support, said pulley comprising a plurality of circumferentially arrayed radially extending pulley segments movable as a unit on said support to change the effective diameter of said pulley.

2. Mechanical transmission means as defined in claim 1, further comprising at least one drive belt drivingly engaged with said pulley segments.

3. Mechanical transmission means as defined in claim 2, further comprising another rotatable support; another composite pulley having a variable diameter movably mounted on said other support and comprising a plurality of circumferentially arrayed radially extending other pulley segments movable as a unit on said other support to change the effective diameter of said other pulley, said drive belt drivingly engaging said other pulley segments, whereby the ratio of effective diameters of both composite pulleys is changeable by moving both pulleys and said drive belt simultaneously as a unit along both supports.

4. Mechanical transmission means as defined in claim 3, further comprising means for moving both pulleys and said drive belt simultaneously as a unit along both supports.

5. Mechanical transmission means as defined in claim 4, further comprising means for coupling a drive motor and driven load to said supports respectively; and means responsive to change in speed of said load for automatically controlling the pulley moving means to set the ratio of diameters of the pulleys at an optimum magnitude.

6. Mechanical transmission means as defined in claim 4, wherein said supports are axially parallel conical members; and means slidably engaging the pulley segments and conical members.

7. Mechanical transmission means as defined in claim 6, wherein the means for moving the pulleys and drive belt simultaneously comprises an assembly of bearing rings contacting the pulley segments; and means for moving said assembly axially of the conical members.

8. Mechanical transmission means as defined in claim 6, wherein the means for moving said assembly comprises a hydraulic cylinder including a piston rod driven by a pump, so that the effective ratio of pulley diameters depends on the axial position of said piston rod and rings along said conical member.

9. Mechanical transmission means as defined in claim 8, wherein said cylinder has a plurality of ports, and conduits controlled by valves interconnecting the pump and cylinder, whereby closing the valves locks the position of the piston rod and maintains a predetermined optimum ratio of pulley diameters.

10. Mechanical transmission means as defined in claim 9, further comprising circuitry interconnecting said valves and drive motor in such a way that change in power supplied by the drive motor in response to variation in said load operates the valves to maintain the ratio of pulley diameters at optimum magnitude.

References Cited

UNITED STATES PATENTS

| 2,026,928 | 1/1936 | Back et al. | 74—217 CV |
| 2,705,892 | 4/1955 | Yeager | 74—217 CV |
| 2,801,547 | 8/1957 | Guibert | 74—217 CV |

FOREIGN PATENTS

| 548,675 | 1/1923 | France | 74—217 CV |
| 298,668 | 7/1932 | Italy | 74—217 CV |

LEONARD H. GERIN, Primary Examiner